US010341625B2

(12) United States Patent
Takasu et al.

(10) Patent No.: US 10,341,625 B2
(45) Date of Patent: Jul. 2, 2019

(54) DISPLAY APPARATUS, DISPLAY CONTROL METHOD, AND COMPUTER-READABLE STORAGE MEDIUM

(71) Applicant: CASIO COMPUTER CO., LTD., Tokyo (JP)

(72) Inventors: Akihide Takasu, Akishima (JP); Tetsuro Narikawa, Hamura (JP); Yoshihiko Shinozaki, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 185 days.

(21) Appl. No.: 15/045,315

(22) Filed: Feb. 17, 2016

(65) Prior Publication Data

US 2016/0269599 A1 Sep. 15, 2016

(30) Foreign Application Priority Data

Mar. 11, 2015 (JP) .................................. 2015-048576

(51) Int. Cl.
*G09G 3/36* (2006.01)
*H04N 9/31* (2006.01)

(52) U.S. Cl.
CPC ......... *H04N 9/3182* (2013.01); *H04N 9/3155* (2013.01)

(58) Field of Classification Search
CPC .................................... H04N 5/16; H04N 5/04
See application file for complete search history.

(56) References Cited

U.S. PATENT DOCUMENTS

| 7,091,947 | B2 * | 8/2006 | Hsieh | H05B 41/2928 |
| | | | | 313/291 |
| 8,593,579 | B2 | 11/2013 | Ishino | |
| 8,872,755 | B2 * | 10/2014 | Kobayashi | G06F 1/1643 |
| | | | | 345/102 |
| 2004/0207609 | A1 * | 10/2004 | Hata | G09G 3/3406 |
| | | | | 345/204 |
| 2007/0242068 | A1 * | 10/2007 | Han | H04N 13/0409 |
| | | | | 345/427 |
| 2008/0180385 | A1 * | 7/2008 | Yoshida | G09G 3/20 |
| | | | | 345/102 |
| 2008/0278637 | A1 * | 11/2008 | Johnson | H04N 5/74 |
| | | | | 348/748 |
| 2009/0160541 | A1 * | 6/2009 | Liu | G06F 1/3228 |
| | | | | 327/544 |
| 2009/0295783 | A1 * | 12/2009 | Baba | G09G 3/3406 |
| | | | | 345/213 |

(Continued)

FOREIGN PATENT DOCUMENTS

JP 2009-265120 A 11/2009

*Primary Examiner* — Jefferey F Harold
*Assistant Examiner* — Humam M Satti
(74) *Attorney, Agent, or Firm* — Scully Scott Murphy & Presser

(57) ABSTRACT

According an embodiment, a display apparatus includes a display unit configured to display video corresponding to a video signal which is input, by using light which a light source emits; a determination unit configured to determine, from the video signal, presence/absence of necessity of light emission by the light source at every given time period; and a controller configured to vary and set the time period which is determined by the determination unit, in accordance with a determination result by the determination unit.

13 Claims, 2 Drawing Sheets

(56) References Cited

U.S. PATENT DOCUMENTS

| | | | | |
|---|---|---|---|---|
| 2010/0117949 | A1* | 5/2010 | Lai | G09G 3/3406 345/102 |
| 2010/0123545 | A1* | 5/2010 | Ozawa | G06F 21/31 340/5.8 |
| 2010/0134527 | A1* | 6/2010 | Inada | G09G 3/3426 345/690 |
| 2010/0231502 | A1* | 9/2010 | Kondo | G09G 3/3406 345/102 |
| 2011/0058105 | A1* | 3/2011 | Nagashima | H04N 5/58 348/602 |
| 2011/0249039 | A1* | 10/2011 | Ogi | G09G 3/3426 345/690 |
| 2012/0169594 | A1* | 7/2012 | Zhao | G09G 3/3406 345/158 |
| 2012/0174037 | A1* | 7/2012 | Relyea | G06F 3/0481 715/848 |
| 2013/0050590 | A1* | 2/2013 | Nobutani | G01B 11/25 348/742 |
| 2013/0107230 | A1* | 5/2013 | Murai | G03B 21/204 353/85 |
| 2013/0207949 | A1* | 8/2013 | Jiang | G09G 3/36 345/207 |
| 2014/0139567 | A1* | 5/2014 | Jeon | G09G 5/10 345/691 |
| 2014/0337654 | A1* | 11/2014 | Chen | G06F 1/3246 713/323 |
| 2015/0161951 | A1* | 6/2015 | Seki | G09G 3/36 345/102 |
| 2015/0242704 | A1* | 8/2015 | Nobori | G09G 5/003 345/589 |
| 2015/0279274 | A1* | 10/2015 | Pyo | G09G 3/3233 345/77 |
| 2017/0039017 | A1* | 2/2017 | Sakai | G06Q 50/10 |

\* cited by examiner

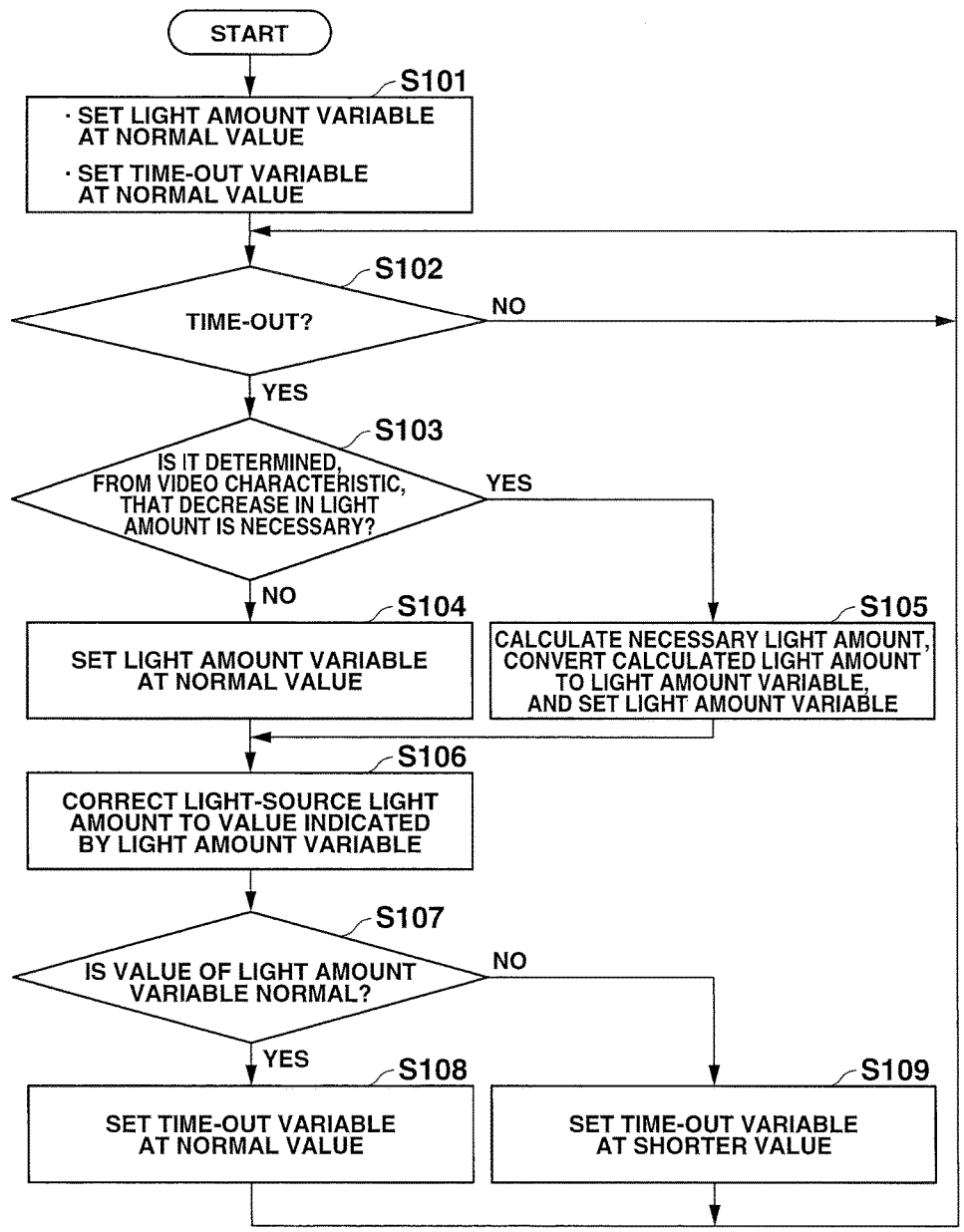

DISPLAY APPARATUS, DISPLAY CONTROL METHOD, AND COMPUTER-READABLE STORAGE MEDIUM

CROSS-REFERENCE TO RELATED APPLICATIONS

This application is based upon and claims the benefit of priority from Japanese Patent Application No. 2015-048576, filed Mar. 11, 2015, the entire contents of which are incorporated herein by reference.

BACKGROUND OF THE INVENTION

1. Field of the Invention

The present invention relates to a display apparatus suitable for a projector or the like, which employs a semiconductor light-emitting element as a light source, a display control method, and a program.

2. Description of the Related Art

Conventionally, there has been proposed a technique for providing a projection-type display apparatus which can realize a high contrast in a display screen. In this technique, two light modulation elements are provided on a projection optical path, and a product of the contrasts of these two light modulation elements is set as a synthetic contrast (for example, Jpn. Pat. Appln. KOKAI Publication No. 2009-265120).

There have been proposed various techniques including the technique of the above-described patent document, which aim at realizing a high contrast by adopting a complex configuration, for example, by using a diaphragm mechanism or a shutter mechanism, and two light modulation element mechanisms, on an optical path of a projection system.

In the meantime, in recent years, a projector device, which employs a semiconductor light-emitting element, such as an LED (light-emitting diode) or an LD (laser diode (semiconductor laser)), as a light source.

In the projector device using this kind of semiconductor light-emitting element as the light source, the element itself of the light source is temporarily turned off in synchronism with a video timing when the entire screen becomes all black during a projection operation. Thereby, the occurrence of so-called "black-floating" due to leak light, etc. in the display element is avoided, and a much higher contrast can be obtained.

However, when the element of the light source is turned off in synchronism with a video timing when the entire screen becomes all black, as described above, it is necessary to turn on the element of the light source once again at an exact timing of projecting, upon restoration of subsequent video, a color other than black on at least a part of the screen.

The present invention has been made in consideration of the above-described circumstances, and the object of the invention is to provide a display apparatus capable of displaying video with a properly high contrast, a display control method, and a program.

BRIEF SUMMARY OF THE INVENTION

In general, according to one embodiment, a display apparatus includes a display unit configured to display video corresponding to a video signal which is input, by using light which a light source emits; a determination unit configured to determine, from the video signal, presence/absence of necessity of light emission by the light source at every given time period; and a controller configured to vary and set the time period which is determined by the determination unit, in accordance with a determination result by the determination unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a flowchart illustrating process contents which a light amount controller and a detection period controller execute in parallel with video display according to the embodiment.

DETAILED DESCRIPTION OF THE PREFERRED EMBODIMENTS

Figure 1:
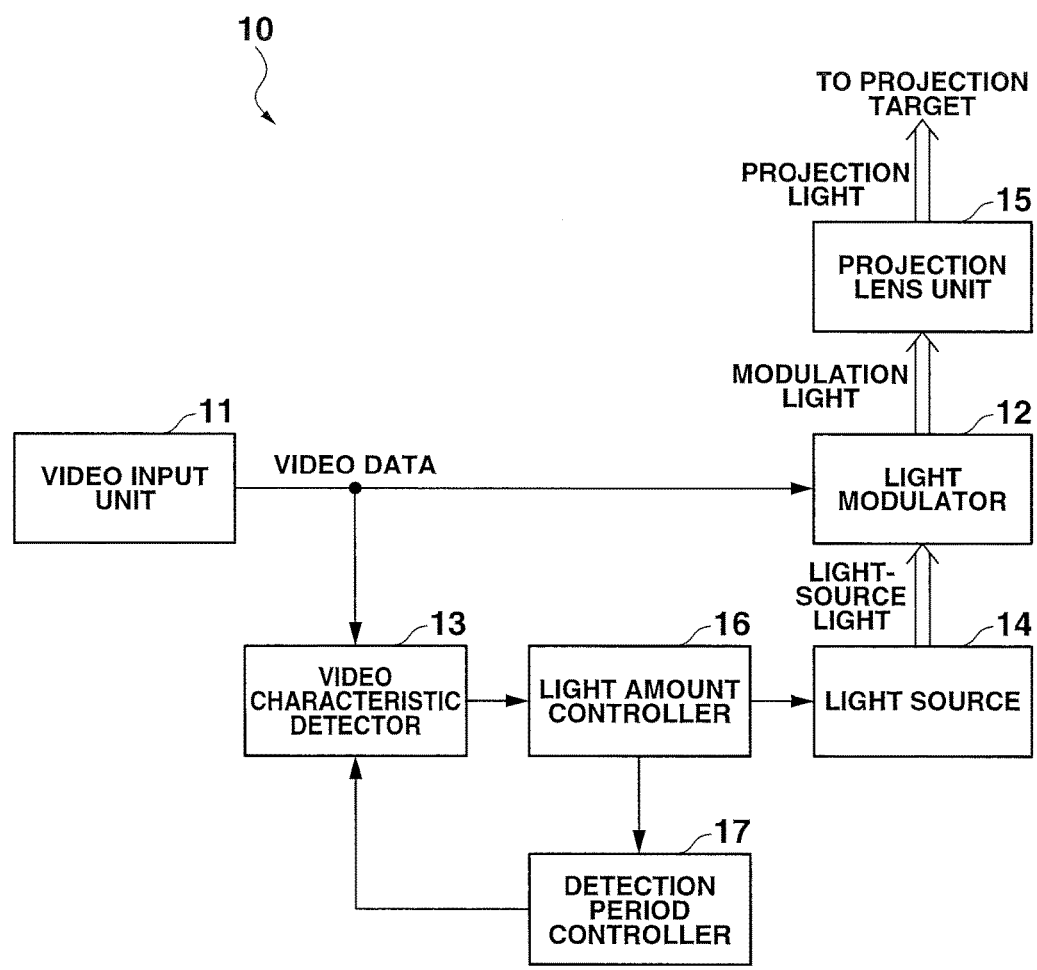
FIG. 1 is a block diagram illustrating a configuration of a functional circuit of a projector device according to an embodiment of the present invention.

Hereinafter, referring to the accompanying drawings, a detailed description will be given of an embodiment in a case in which the present invention is applied to a projector device of a DLP (Digital Light Processing) (trademark) method.

FIG. 1 is a block diagram illustrating a configuration of a functional circuit of a projector device 10 according to the embodiment. In FIG. 1, various video signals from an external device, for instance, a personal computer (not shown) or an information device such as a smartphone having a video playback function, are input from a video input unit 11.

If the input video signal is an analog signal, the video input unit 11 converts the analog signal to digital data, where necessary. Then, the video input unit 11 executes conversion in accordance with a format such as a preset image size, frame rate and pixel-by-pixel quantization bit number, and outputs the converted video data to a light modulator 12 and a video characteristic detector 13.

The light modulator 12 is composed of a micro-mirror element and a driver circuit for driving the micro-mirror. The micro-mirror element is configured such that very small movable mirrors, the number of which is equal to the number of pixels of, e.g. WXGA (1280 dots×800 dots), are arranged in a matrix. The light modulator 12 executes a display operation which corresponds to a given video signal.

Light of a primary color or a complementary color is radiated from a light source 14 to the light modulator 12 in a time-division manner. The light source 14 includes an LED (light-emitting diode) and an LD (laser diode (semiconductor laser)), which are semiconductor light-emitting elements. The light source 14 radiates primary-color light to the light modulator 12 in a time-division manner by singly emitting R (red) light, G (green) light or B (blue) light of a primary color. The light source 14 radiates complementary-color light as compound-color light to the light modulator 12 in a time-division manner by simultaneously emitting lights of two colors or three colors.

In the meantime, the light source 14 is not limited to such a configuration as to emit direct light from the semiconductor light-emitting element to the light modulator 12. For example, such a configuration is thinkable that B light, which is emitted by the LD, is radiated on a phosphor within the light source 14, and G light, which is obtained as transmissive light or reflective light of the radiated B light, is emitted to the light modulator 12.

In addition, a light image is formed by reflective light at the light modulator 12, and the formed light image is enlarged by a projection lens unit 15 and radiated toward a screen (not shown) or the like, which is a projection target.

On the other hand, the video characteristic detector 13 is configured to detect, as a video characteristic, the brightness of the entirety of video with respect to the video data from the video input unit 11. The video characteristic detector 13 outputs the detection result to a light amount controller 16.

The light amount controller 16 controls the light emission amount of the light source 14 in accordance with the detection result from the video characteristic detector 13. A control signal of the light amount controller 16, which is delivered to the light source 14, is also transmitted to a detection period controller 17. The detection period controller 17 controls the detection period of the video characteristic detector 13, based on the control signal from the light amount controller 16.

Next, the operation of the above-described embodiment is described.

FIG. 2 is a flowchart illustrating process contents which the light amount controller 16 and detection period controller 17 execute in parallel with video display by the light modulator 12, when the projector device 10 performs the projection operation.

At the beginning of the process, while the light amount controller 16 sets a light amount variable for light-emission driving of the light source 14 at a normal value as a default value, the detection period controller 17 sets a time-out variable for controlling the detection timing of the video characteristic detector 13 at a normal value (step S101).

By the light amount controller 16 setting the light amount variable at the normal value, the light source 14 operates in accordance with a projection mode which is selected at that time point. For example, when a "theater" mode, which places importance on a black part and the saturation of colors, is selected from among "standard/graphics/theater/blackboard/game", the light source 14 is driven to emit light with a brightness of 75% of the maximum brightness, and the light source 14 radiates light-source light onto the light modulator 12, and thus a normal projection operation is performed.

In addition, by the detection period controller 17 setting the time-out variable at the normal value, the detection period controller 17 instructs the video characteristic detector 13 to execute detection at a period of, e.g. 300 msec, while suppressing the power consumption in the video characteristic detector 13.

Here, the detection period controller 17 stands by until the coming of a timing of time-out, in accordance with the set time-out variable (step S102).

For example, if the frame rate of projection video is 60 frames/sec, the detection period controller 17 determines that the timing of time-out has come at a period of 18 frames of video (Yes in step S102). The detection period controller 17 causes the video characteristic detector 13 to detect the bright of the entire screen as a characteristic of video data which is input from the video input unit 11 at that time point, to be more specific, whether the entire screen is all black or not. Thereafter, from this detection result, the light amount controller 16 determines whether or not to decrease the emission light amount of the light source 14 (step S103).

If it is determined that the entire screen is not all black as the characteristic of the video data and that video is projected with some brightness (No in step S103), the light amount controller 16 sets the light amount variable for the light source 14 at the normal value (step S104).

If it is determined in step S103 that the entire screen is all black as the characteristic of the video data and that no video is projected (Yes in step S103), the light amount controller 16 calculates a necessary light amount for the light source 14, converts the calculated light amount to a light amount variable, and sets the light amount variable (step S105). Specifically, when the entire scree of video is all black, a light amount variable "0" for temporarily turning off the light source 14 is calculated and set.

After the setup process of the light amount variable in step S104 or S105, the light amount controller 16 corrects the light emission state of the light source 14, based on the light amount variable that was set by the light amount controller 16 (step S106).

Next, the detection period controller 17 determines whether the value of the light amount variable, which was set by the light amount controller 16, is the value at the normal time or not, that is, whether the light emission amount of the light source 14 has temporarily decreased or not (step S107).

Here, if it is determined that the light amount value is the normal value (Yes in step S107), the detection period controller 17 sets, like the above-described step S101, the time-out variable at a value corresponding to the normal value in the video characteristic detector 13 (step S108), and returns to the process beginning from step S102. For example, the detection period controller 17 sets the time-out variable at a value corresponding to 300 msec, and returns to the process from step S102.

If it is determined that the light amount value is not the normal value (No in step S107), the detection cycle controller 17 sets, as the time-out variable in the video characteristic detector 13, a value which makes the time period shorter, for example, a value corresponding to 16 msec or less (a time corresponding to one frame or less at a frame rate of 60 frames/sec) (step S109), and returns to the process from S102.

In this manner, the time-out variable, which makes the time period much shorter than the time-out variable at the normal time, is set in the video characteristic detector 13. By this setting, in particular, in the state in which the light source 14 is temporarily turned off, the process beginning from step S103 is executed at a higher frequency with a shorter period. Thereby, for example, when such video is projected that "lightning" occurs partly from a "dark" state of the entire screen, the light source 14 that is in a temporarily turned-off state is quickly activated and the light emission operation is resumed, so as to reduce the occurrence of missing of a video part at the beginning of "lightning" in the projected image.

Accordingly, in the state in which the entirety of the video screen is all black, since the light emission itself of the light source 14 is temporarily stopped, a phenomenon such as so-called "black-floating" does not occur, and a high contrast can be maintained. At the same time, it is possible to minimize the missing of video at a time of displaying some subsequent video.

In addition, in the state in which some video with normal brightness is being projected, the time-out variable is set at a large value. Thereby, the operation period of the detection operation by the video characteristic detector 13 is increased, and the frequency of execution is lowered. Therefore, the power consumption in the detection period controller 17 can be lowered.

In the meantime, the circuit relating to the process from the detection to the control by the video characteristic detector 13, light amount controller 16 and detection period controller 17 can be realized by a hardware circuit, or can be realized by a software program by a processor which actually executes the operation control of the projector device 10.

In the case of realizing the above circuit by the hardware circuit, the time-out variable is set at substantially "zero", and it is possible to determine, at every 1 frame of input video data, whether the video data is video with a light amount that is to be decreased by the light source 14, or whether the video data is to be projected with a light amount of a set normal brightness.

Accordingly, the load on the processor that executes the operation control of the projector device 10 can greatly be decreased. Moreover, for example, from the state in which the light source 14 is turned off with all-black video on the entire screen, the light source 14 can immediately be activated to emit light, based on an input of video with brightness, and the projection of video can be resumed without missing of video.

Assume now that the video characteristic detector 13, light amount controller 16 and detection period controller 17 are realized by the software program by the processor which executes the operation control of the projector device 10. At this time, it is difficult to make shorter, to such a degree as in the case of realization by the hardware circuit, the time period from the turn-off state of the light source 14 to the reactivation of the light source 14 to emit light in accordance with a video signal and to resume the projection of video. However, it is possible to be flexibly adaptive to conditions such as a projection mode, an input signal type and a specific function setup time, and to be adaptive to version upgrades.

As has been described above in detail, according to the present embodiment, while the load on the circuit and the power consumption are reduced, video with a high contrast can be displayed.

In the meantime, in the above-described embodiment, the description has been given on the assumption that the brightness, color tone, etc. of color video can be selected in accordance with a projection mode such as "standard/graphics/theater/blackboard/game", and the light amount variable is set in accordance with the selected content. However, there is a projection mode in which video projection with a high contrast is not needed. For example, when the above-described "blackboard" mode, in which video projection on a dark-green blackboard is mainly performed, is selected, or when the projector device 10 is used for presentation, it is possible to intentionally skip the execution of the process illustrated in FIG. 2, and to make switching not to execute the temporary turn-off process of the light source 14 for suppressing "black-floating".

By selectively setting the present operation for obtaining a high contrast in the above projection mode, it becomes possible to further reduce the processing load on the processor, etc. in the situation in which video projection with a high contrast is not needed.

In addition, in the above-described embodiment, it was simply described that various video signals can be input to the video input unit 11. However, it is possible to execute the process illustrated in FIG. 2 in order to obtain video with a high contract for a high-quality video input, such as an HDMI (trademark) (High-Definition Multimedia Interface) signal or an S video signal. Meanwhile, it is possible to intentionally skip the execution of the process of FIG. 2 for an input of a video signal which does not require a relatively high image quality, such as an RGB signal or an RCA video signal.

In this manner, by selectively setting the present operation for obtaining a high contrast for the type of the input video signal, it is possible to further reduce the processing load on the processor, etc. in the situation in which video projection with a high contrast is not needed.

Similarly, the processing load on the processor, etc. may be reduced by intentionally skipping the process of FIG. 2 at a time of selecting, as the function of the projector device, a function which does not require a relatively high image quality, for example, at a time of selecting a trapezoid correction function which maintains a rectangle on a projection screen by intentionally deforming projected video, or at a time of writing other video on projected video when presentation is executed, or at a time of performing superimposed projection of a pointer image.

Incidentally, in the above-described embodiment, the case has been described in which the present invention is applied to the projector device of a DLP (trademark) method. However, in the present invention, the projection method is not limited, nor is the application of this invention limited to the projector device. For example, the invention is similarly applicable to flat-panel displays, such as a liquid crystal display in which a color liquid crystal panel is used as a display element and an LED is used as a light source of backlight, and an organic EL (electroluminescence) display.

The present invention is not limited to the above-described embodiment. In practice, various modifications may be made without departing from the spirit of the invention. In addition, the functions executed in the embodiment may be implemented by being properly combined as much as possible. The above-described embodiments include inventions in various stages, and various inventions can be derived from proper combinations of structural elements disclosed herein. For example, even if some structural elements in all the structural elements disclosed in the embodiment are omitted, if the advantageous effect can be obtained, the structure without such structural elements can be derived as an invention.

What is claimed is:

1. A display apparatus comprising:
a display screen for displaying a video based on video data, wherein the display screen comprises:
a light source configured to be controlled to emit light and to temporarily stop emission of the light, based on the video data; and
a light modulator configured to modulate the light emitted by the light source; and
a processor configured to:
control the light source to emit the light based on the video data and the light modulator to modulate the light emitted by the light source, to display the video; and while controlling the light source to emit the light based on the video data to display the video:
  determine whether a time-out period set to a first length has passed;
  in response to determining that the time-out period set to the first length has passed, perform a first determination, based on the video data, of whether to temporarily stop emission of the light so that the display screen is black; and
  in response to determining, in the first determination, to temporarily stop emission of the light so that the display screen is black:
    control the light source to temporarily stop emission of the light;
    set the time-out period to a second length shorter than the first length;
    determine whether the time-out period set to the second length has passed;
    in response to determining that the time-out period set to the second length has passed, perform a second determination, based on the video data, of whether to temporarily stop emission of the light; and
    control the light source based on a result of the second determination.

2. The display apparatus of claim 1,
wherein the processor is configured to:
  determine, from the video data, at least one of a brightness and a color tone of the video; and
  set the first length of the time-out period based on the at least one of the brightness and the color tone of the video determined.

3. The display apparatus of claim 1,
wherein the processor is configured to:
  determine a type of the video data; and
  set the first length of the time-out period based on the type of the video data determined.

4. The display apparatus of claim 2,
wherein the processor is configured to:
  determine a type of the video data; and
  set the first length of the time-out period based on the at least one of the brightness and the color tone of the video determined, and the type of the video data determined.

5. The display apparatus of claim 1,
wherein the processor is configured to:
  determine an image quality of the video; and
  set the first length of the time-out period based on the image quality of the video determined.

6. The display apparatus of claim 2,
wherein the processor is configured to:
  determine an image quality of the video; and
  set the first length of the time-out period based on the at least one of the brightness and the color of the video determined, and the image quality of the video determined.

7. The display apparatus of claim 3,
wherein the processor is configured to:
  determine an image quality of the video as the type of the video data.

8. The display apparatus of claim 4,
wherein the processor is configured to:
  determine an image quality of the video as the type of the video data.

9. The display apparatus of claim 1,
wherein the light source comprises a semiconductor light-emitting element.

10. The display apparatus of claim 2,
wherein the light source comprises a semiconductor light-emitting element.

11. A method for controlling a display screen for displaying a video based on video data, wherein the display screen comprises:
  a light source configured to be controlled to emit light and to temporarily stop emission of the light, based on the video data; and
  a light modulator configured to modulate the light emitted by the light source, wherein the method comprises:
    controlling the light source to emit the light based on the video data and the light modulator to modulate the light emitted by the light source, to display the video; and
    while controlling the light source to emit the light based on the video data to display the video:
      determining whether a time-out period set to a first length has passed;
      in response to determining that the time-out period set to the first length has passed, performing a first determination, based on the video data, of whether to temporarily stop emission of the light so that the display screen is black; and
      in response to determining, in the first determination, to temporarily stop emission of the light so that the display screen is black:
        controlling the light source to temporarily stop emission of the light;
        setting the time-out period to a second length shorter than the first length;
        determining whether the time-out period set to the second length has passed;
        in response to determining that the time-out period set to the second length has passed, performing a second determination, based on the video data, of whether to temporarily stop emission of the light; and
        controlling the light source based on a result of the second determination.

12. A non-transitory computer readable storage medium having stored therein instructions for controlling a display screen for displaying a video based on video data, wherein the display screen comprises:
  a light source configured to be controlled to emit light and to temporarily stop emission of the light, based on the video data; and
  a light modulator configured to modulate the light emitted by the light source, wherein the instructions cause a computer to, at least:
    control the light source to emit the light based on the video data and the light modulator to modulate the light emitted by the light source, to display the video; and
    while controlling the light source to emit the light based on the video data to display the video:
      determine whether a time-out period set to a first length has passed;
      in response to determining that the time-out period set to the first length has passed, perform a first determination, based on the video data, of whether to temporarily stop emission of the light so that the display screen is black; and
      in response to determining, in the first determination, to temporarily stop emission of the light so that the display screen is black:

control the light source to temporarily stop emission of the light;

set the time-out period to a second length shorter than the first length;

determine whether the time-out period set to the second length has passed;

in response to determining that the time-out period set to the second length has passed, perform a second determination, based on the video data, of whether to temporarily stop emission of the light; and control the light source based on a result of the second determination.

13. The display apparatus of claim 1,
wherein the processor is configured to:
in response to determining, in the first determination, to not temporarily stop emission of the light:
maintain the time-out period at the first length;
determine whether the time-out period set to the first length has passed;
in response to determining that the time-out period set to the first length has passed, perform a third determination, based on the video data, of whether to temporarily stop emission of the light; and
control the light source based on a result of the third determination.

* * * * *